United States Patent
Muraoka et al.

(10) Patent No.: US 7,626,628 B2
(45) Date of Patent: Dec. 1, 2009

(54) PHOTOELECTRIC CONVERSION DEVICE, IMAGE SENSOR, OPTICAL READER, AND METHOD OF DRIVING PHOTOELECTRIC CONVERSION DEVICE

(76) Inventors: Daisuke Muraoka, c/o Seiko Instruments Inc. 8, Nakase 1-chome, Mihama-ku, Chiba-shi, Chiba (JP); Masahiro Yokomichi, c/o Seiko Instruments Inc. 8, Nakase 1-chome, Mihama-ku, Chiba-shi, Chiba (JP)

( * ) Notice: Subject to any disclaimer, the term of this patent is extended or adjusted under 35 U.S.C. 154(b) by 394 days.

(21) Appl. No.: 11/810,791

(22) Filed: Jun. 6, 2007

(65) Prior Publication Data

US 2007/0291147 A1 Dec. 20, 2007

(30) Foreign Application Priority Data

Jun. 12, 2006 (JP) ............... 2006-162803

(51) Int. Cl.
*H04N 3/14* (2006.01)
*H01L 27/00* (2006.01)
*H03F 3/08* (2006.01)
*H01L 31/062* (2006.01)

(52) U.S. Cl. ............... 348/308; 348/301; 348/302; 348/307; 250/208.1; 250/214 A; 257/291

(58) Field of Classification Search ............... 348/308, 348/301, 302, 307; 250/208.1, 214 A, 214 R; 257/291, 297
See application file for complete search history.

(56) References Cited

U.S. PATENT DOCUMENTS

| | | | |
|---|---|---|---|
| 5,933,188 A * | 8/1999 | Shinohara | 348/302 |
| 6,493,030 B1 * | 12/2002 | Kozlowski et al. | 348/310 |
| 6,697,111 B1 * | 2/2004 | Kozlowski et al. | 348/302 |
| 7,102,115 B2 * | 9/2006 | Machida et al. | 250/208.1 |
| 7,477,299 B2 * | 1/2009 | Higuchi et al. | 348/241 |
| 2002/0036700 A1 * | 3/2002 | Merrill | 348/308 |
| 2004/0046879 A1 * | 3/2004 | Ohzu et al. | 348/243 |
| 2005/0001148 A1 * | 1/2005 | Watanabe | 250/208.1 |

\* cited by examiner

*Primary Examiner*—Lin Ye
*Assistant Examiner*—Marly Camargo

(57) ABSTRACT

Provided is a photoelectric conversion device, including: a plurality of photoelectric conversion blocks each including a photoelectric conversion element, photoelectric conversion element resetting means for supplying an initialization potential to the photoelectric conversion element to reset the photoelectric conversion element, and transfer means for transferring a voltage of the photoelectric conversion element, in which the photoelectric conversion element resetting means resets the photoelectric conversion element every time the voltage of the photoelectric conversion element is transferred and for a standby period, during a reading period. Therefore, it is possible to perform accurate image reading by reducing the influence of a foreign matter adhered to a light receiving surface of a photoelectric conversion device.

7 Claims, 6 Drawing Sheets

PHOTOELECTRIC CONVERSION DEVICE, IMAGE SENSOR, OPTICAL READER, AND METHOD OF DRIVING PHOTOELECTRIC CONVERSION DEVICE

This application claims priority under 35 U.S.C. § 119 to Japanese Patent Application No. JP2006-162803 filed Jun. 12, 2006, the entire content of which is hereby incorporated by reference.

BACKGROUND OF THE INVENTION

1. Field of the Invention

The present invention relates to a photoelectric conversion device for converting incident light into an electrical signal and an image reading apparatus using the photoelectric conversion device, such as a facsimile machine or an image scanner.

2. Description of the Related Art

A contact type linear image sensor is used for an image reading apparatus such as a facsimile machine or an image scanner (see, for example, JP 2004-282716 A). FIG. 4 is a circuit diagram showing a photoelectric conversion block 15 of a photoelectric conversion device used for the image sensor.

The photoelectric conversion block 15 includes a photodiode 1, a reset switch 2 for resetting the photodiode 1 to a reset potential Vrst, an amplifier 3 for amplifying an output voltage of the photodiode 1, a transfer switch 4 for transferring an output voltage of the amplifier 3 to a capacitor 5, a reading MOS transistor 6, and a channel selection switch 7.

The photoelectric conversion block 15 shown in FIG. 4 corresponds to one of a plurality of photoelectric conversion blocks provided in the photoelectric conversion device. The photoelectric conversion block 15 is provided for each pixel and connected with a common signal line through the channel selection switch 7 thereof.

The photoelectric conversion device is driven as follows to perform image reading.

When the reset switch 2 is turned on in response to a reset signal ΦR, a cathode of the photodiode 1 is reset to the reset potential Vrst. At this time, the reset potential Vrst obtained before light receiving is amplified by the amplifier 3. Then, when the transfer switch 4 is turned on, the reset potential is stored in the capacitor 5.

After the reset potential Vrst is stored in the capacitor 5, the transfer switch 4 is turned off.

When the photodiode 1 which is reset to the reset potential Vrst receives light, a potential of the cathode thereof is reduced corresponding to the amount of received light.

After the light is received by the photodiode 1 for a predetermined period, the channel selection switch 7 is turned on to read, into the common signal line, the reset potential Vrst which is obtained before light receiving and stored in the capacitor 5. Then, the transfer switch 4 is turned on to read, into the common signal line, a potential of the cathode of the photodiode 1 which is obtained after light receiving.

Therefore, a difference between the reset potential Vrst obtained before light receiving and the potential of the cathode of the photodiode 1 which is obtained after light receiving is detected to perform image reading.

However, the conventional image sensor has a problem that an image cannot be accurately read at the time of start of image reading by a phenomenon as described above.

FIG. 5 is a timing chart showing driving signals of the conventional photoelectric conversion device. When an activation operation is performed while a power source is turned on, the image sensor performs an image reading operation in response to a start signal ΦSTR.

At this time, it is necessary to start reading after the cathode (node C) of the photodiode 1 shown in FIG. 4 is reset to the reset potential Vrst.

The node C is floating in a standby state after the power source is turned on. For example, in the case of a P-type substrate, a potential of the node C becomes substantially a substrate potential VSS by a leak from the photodiode. Therefore, as shown in FIG. 5, it is necessary to execute an idle cycle approximately ten times in order to sufficiently reset a potential of the node C to reset potential Vrst.

Here, a light receiving surface of the photoelectric conversion device cannot be sealed with a resin in the view of the structure of the image sensor, so adhesion of foreign matters on the light receiving surface cannot be prevented.

A conductive foreign matter 8 adhered to the light receiving surface is expressed by an equivalent circuit as shown in FIG. 4. In the standby state after the power source is turned on, a potential of a node D becomes a potential equal to the potential of the node C, that is, substantially the substrate potential VSS.

Therefore, as shown in FIG. 5, the potential of the node D becomes the reset potential Vrst simultaneously with the time when the potential of the node C is reset to the reset potential Vrst. After a lapse of several seconds, the potential of the node D is stabilized at the substrate potential VSS.

Thus, there is a problem that, during a reading period, the potential of the node C is influenced for several seconds in which the potential of the node D is stabilized at the substrate potential VSS, thereby causing an afterimage phenomenon.

FIG. 6 shows the afterimage phenomenon in the conventional photoelectric conversion device. Data obtained by reading a black and white document as shown in FIG. 6 using an image sensor 20 is a read image. A state in which a conductive foreign matter 21 is adhered to a photoelectric conversion element surface of the image sensor 20 is shown in FIG. 6.

Instead of an image of black data, an afterimage of white data immediately before the black data, is produced by the influence of a conductive foreign matter 21 adhered to the photoelectric conversion element surface of the image sensor 20. That is, the afterimage phenomenon occurs.

SUMMARY OF THE INVENTION

Therefore, an object of the present invention is to perform accurate image reading by reducing the influence of a foreign matter adhered to a light receiving surface of a photoelectric conversion device.

In order to solve the conventional problem, a photoelectric conversion device used for an image sensor according to the present invention has the following structure and is driven by the following driving method.

(1) According to a first aspect of the present invention, there is provided a photoelectric conversion device, including:
a plurality of photoelectric conversion blocks each including:
  a photoelectric conversion element;
  photoelectric conversion element resetting means for supplying an initialization potential to the photoelectric conversion element to reset the photoelectric conversion element; and
  transfer means for transferring a voltage of the photoelectric conversion element, in which the photoelectric conversion element resetting means resets the photoelectric conversion element every time the voltage of the photoelectric conversion element is transferred and for a standby period, during a reading period.

(2) According to a second aspect of the present invention, in the photoelectric conversion device according to the first aspect:

the resetting means includes:
  a switch connected with a terminal for the initialization potential; and
  reset signal output means for controlling an on/off state of the switch;
the reset signal output means outputs a first reset signal for resetting the photoelectric conversion element to the switch every time the voltage of the photoelectric conversion element is transferred, during the reading period; and
the reset signal output means outputs a second reset signal for resetting the photoelectric conversion element to the switch for the standby period.

(3) According to a third aspect of the present invention, in the photoelectric conversion device according to the second aspect:

the reset signal output means includes a second reset signal generating circuit for generating the second reset signal;
the second reset signal generating circuit generates the second reset signal when a power source is turned on; and
the second reset signal generating circuit stops the second reset signal for a predetermined period when a start signal generated during the reading period is inputted.

(4) According to a fourth aspect of the present invention, in the photoelectric conversion device according to the third aspect, the second reset signal generating circuit includes:

waveform formation means for outputting the second reset signal to the switch;
voltage supplying means connected with an input of the waveform formation means, for supplying a potential of the second reset signal to the input of the waveform formation means;
switch means connected with the input of the waveform formation means, for changing a potential of the input of the waveform formation means to a potential for stopping the second reset signal in response to the start signal; and
voltage holding means connected with the input of the waveform formation means, for holding the potential for stopping the second reset signal as the potential of the input of the waveform formation means when the switch means is turned off.

(5) According to a fifth aspect of the present invention, there is provided an image sensor, including a plurality of photoelectric conversion devices each being the photoelectric conversion device according to any one of claims 1 to 4.

(6) According to a sixth aspect of the present invention, there is provided an optical reading apparatus, including the image sensor according to claim 5.

(7) According to a seventh aspect of the present invention, there is provided a method of driving a photoelectric conversion device, including:

resetting a photoelectric conversion element for a standby period of the photoelectric conversion element;

releasing the reset of the photoelectric conversion element in response to a start signal generated during an image reading period of the photoelectric conversion element; and reading an image by the released photoelectric conversion element.

(8) According to an eighth aspect of the present invention, in the method of driving a photoelectric conversion device according to the seventh aspect, the photoelectric conversion element is reset when a power source is turned on.

According to the photoelectric conversion device used for an image sensor and the driving method therefor in the present invention, the photoelectric conversion element is reset for a standby period of the photoelectric conversion element. Therefore, it is possible to perform accurate image reading by reducing the influence of a conductive foreign matter adhered to a light receiving surface of the photoelectric conversion device. Accordingly, a high-accuracy contact type image sensor can be provided.

DETAILED DESCRIPTION OF THE PREFERRED EMBODIMENTS

Figure 1:
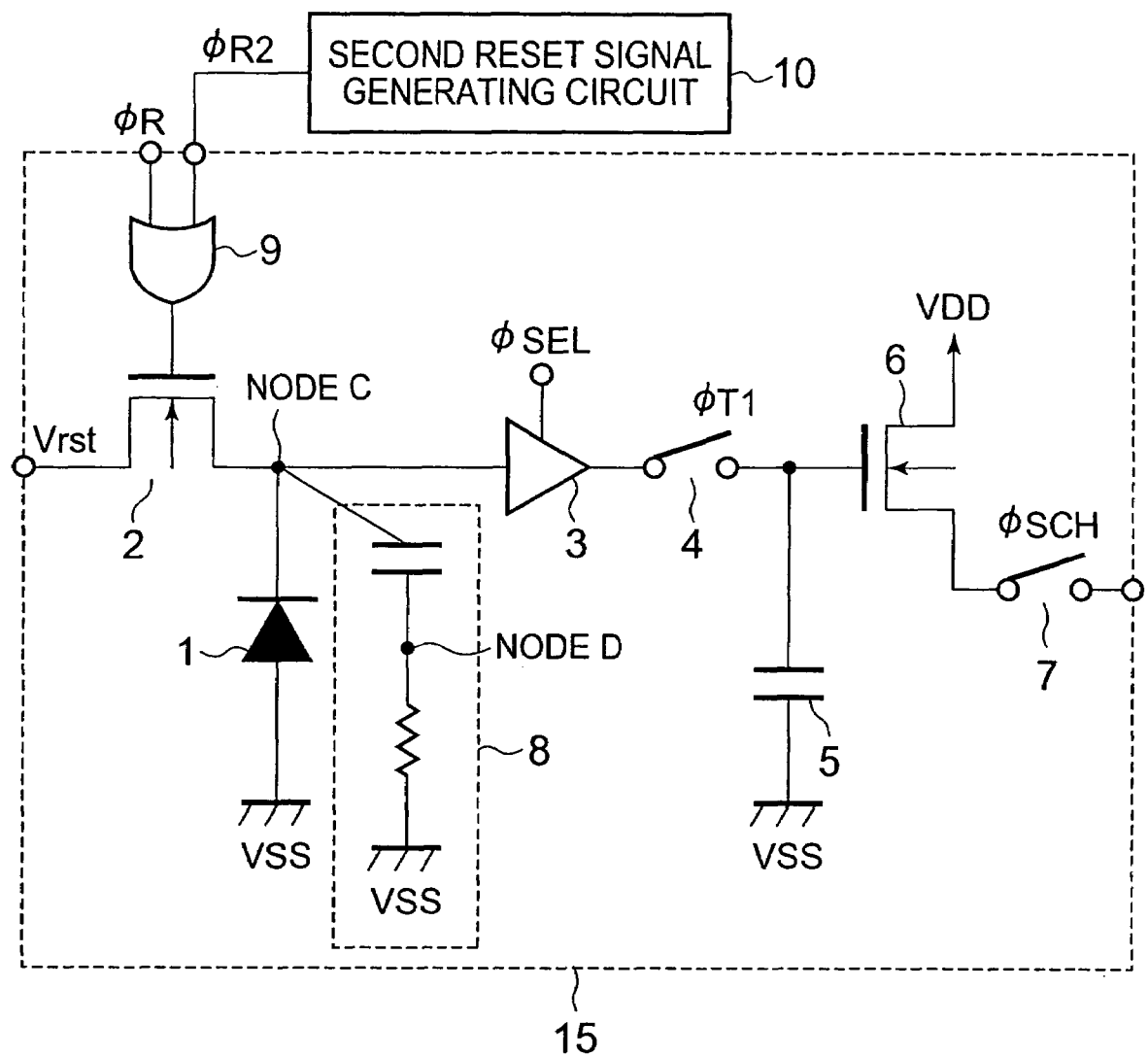
FIG. 1 is a circuit diagram showing a photoelectric conversion block of a photoelectric conversion device used for an image sensor according to an embodiment of the present invention.

FIG. 1 is a circuit diagram showing a photoelectric conversion block 15 of a photoelectric conversion device used for an image sensor according to an embodiment of the present invention.

The photoelectric conversion block 15 has the following structure.

A photodiode 1 includes an anode connected with a ground potential terminal and a cathode connected with a terminal for a reset potential Vrst which is an initialization potential through a reset switch 2. The cathode of the photodiode 1 is further connected with an input terminal of an amplifier 3.

An output terminal of the amplifier 3 is connected with a capacitor 5 for storing the reset potential Vrst for the photodiode 1 and a gate of a reading MOS transistor 6 through a transfer switch 4.

A drain of the reading MOS transistor 6 is connected with a channel selection switch 7.

The photoelectric conversion block 15 in this embodiment further includes an OR circuit 9 which is a reset signal output circuit for controlling the turning on/off of the reset switch 2. The OR circuit 9 is connected with a control terminal of the reset switch 2.

The OR circuit 9 receives a reset signal for resetting a photoelectric conversion element for each data reading or a second reset signal for resetting the photoelectric conversion element in a standby state after a power source is turned on and outputs corresponding one of the reset signal and the second reset signal to the control terminal of the reset switch 2.

The photoelectric conversion block 15 shown in FIG. 1 corresponds to one of a plurality of photoelectric conversion blocks provided in the photoelectric conversion device. The photoelectric conversion block 15 is provided for each pixel and connected with a common signal line through the channel selection switch 7 thereof.

A second reset signal output circuit 10 for supplying the second reset signal to the OR circuit 9 is provided inside the photoelectric conversion device including the photoelectric conversion blocks 15.

The second reset signal output circuit 10 may be provided outside the photoelectric conversion device.

The photoelectric conversion device is driven as follows to perform image reading.

Figure 2:
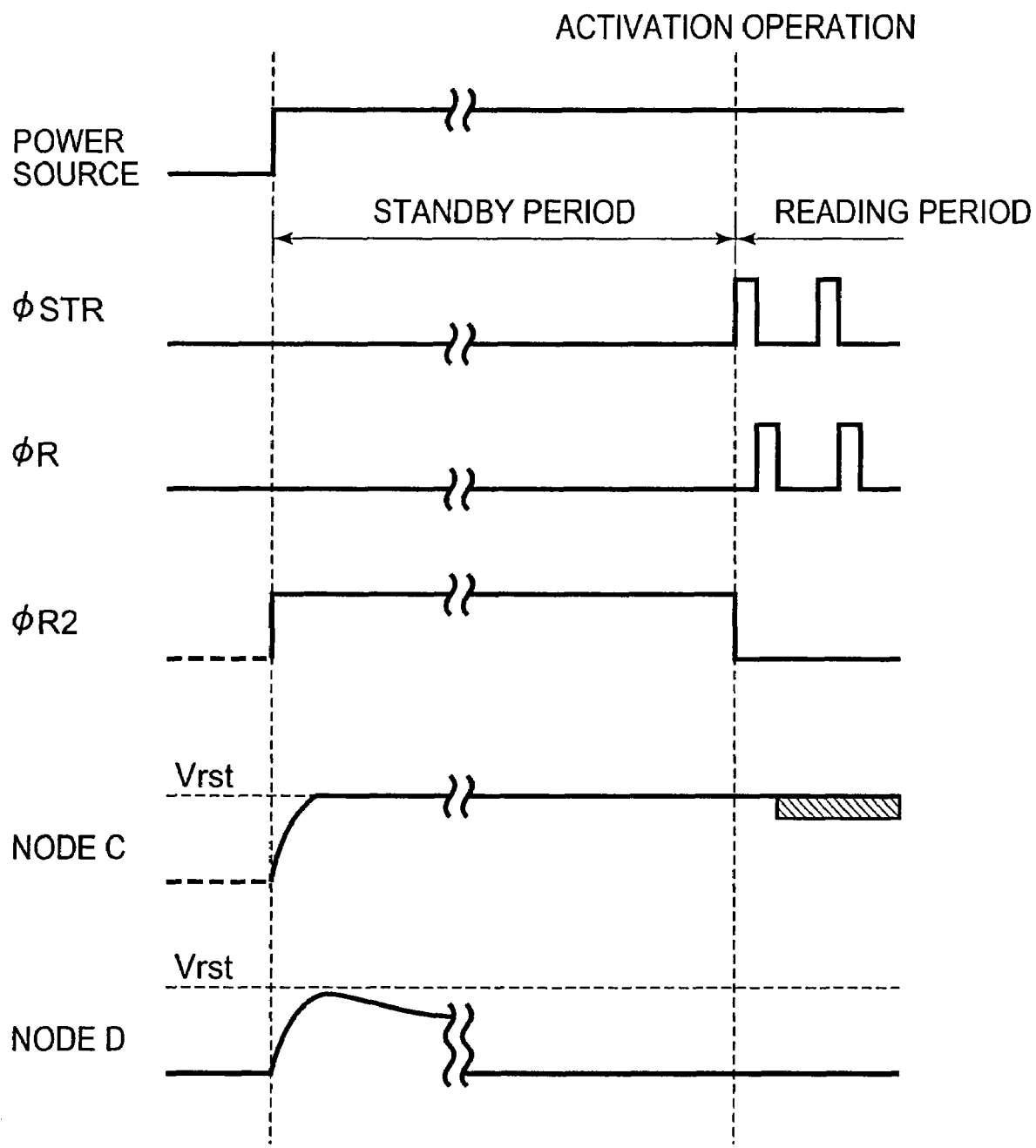
FIG. 2 is a timing chart showing driving signals of photoelectric conversion block in the embodiment of the present invention.

FIG. 2 is a timing chart showing driving signals of photoelectric conversion block 15 in this embodiment.

When the power source for the image sensor is turned on, the second reset signal output circuit 10 outputs a second reset signal ΦR2 to each of the photoelectric conversion blocks 15. In each of the photoelectric conversion blocks 15, the second reset signal ΦR2 is supplied to the reset switch 2 through the OR circuit 9 to turn on the reset switch 2.

Then, the cathode of the photodiode 1, that is, a node C is reset to the reset potential Vrst. Simultaneously, a potential of a node D of a conductive foreign matter 8 becomes the reset potential Vrst.

After the potential of the node D of the conductive foreign matter 8 temporarily becomes the reset potential Vrst, the potential thereof is gradually reduced by discharging from a capacitor component through a resistor component and slowly approaches a substrate potential VSS. At this time, the node C can be reset to the reset potential Vrst in a shorter time than the conventional driving method of supplying the pulsed reset potential Vrst during the idle cycle.

Here, each of a period between the time when the power source for the image sensor is turned on and the time when an activation operation is performed and a period between the time when a reading period for the activation operation is completed and the time when a next activation operation is performed is referred to as a standby period.

During the standby period, the reset switch 2 is continuously turned on by the second reset signal ΦR2, so that the reset potential Vrst continues to be applied to the cathode of the photodiode 1, that is, the node C.

When the image sensor is activated during the standby period, a start signal ΦSTR is inputted to the second reset signal output circuit 10 to turn off the second reset signal ΦR2. Then, the start signal ΦSTR is inputted to each of the photoelectric conversion blocks 15 to start a reading operation, thereby entering the reading period.

When the reset switch 2 is turned on in response to a reset signal ΦR, the cathode of the photodiode 1 is reset to the reset potential Vrst. At this time, the reset potential Vrst obtained before light receiving is amplified by the amplifier 3. Then, when the transfer switch 4 is turned on, the reset potential is stored in the capacitor 5.

After the reset potential Vrst is stored in the capacitor 5, the transfer switch 4 is turned off. When the photodiode 1 which is reset to the reset potential Vrst receives light, the potential of the cathode is reduced corresponding to the amount of received light. After the light is received by the photodiode 1 for a predetermined period, the channel selection switch 7 is turned on to read, into the common signal line, the reset potential Vrst which is obtained before light receiving and stored in the capacitor 5. Then, the transfer switch 4 is turned on to read, into the common signal line, a potential of the cathode of the photodiode 1 which is obtained after light receiving.

Therefore, a difference between the reset potential Vrst obtained before light receiving and the potential of the cathode of the photodiode 1 which is obtained after light receiving is detected to perform image reading.

Figure 3:
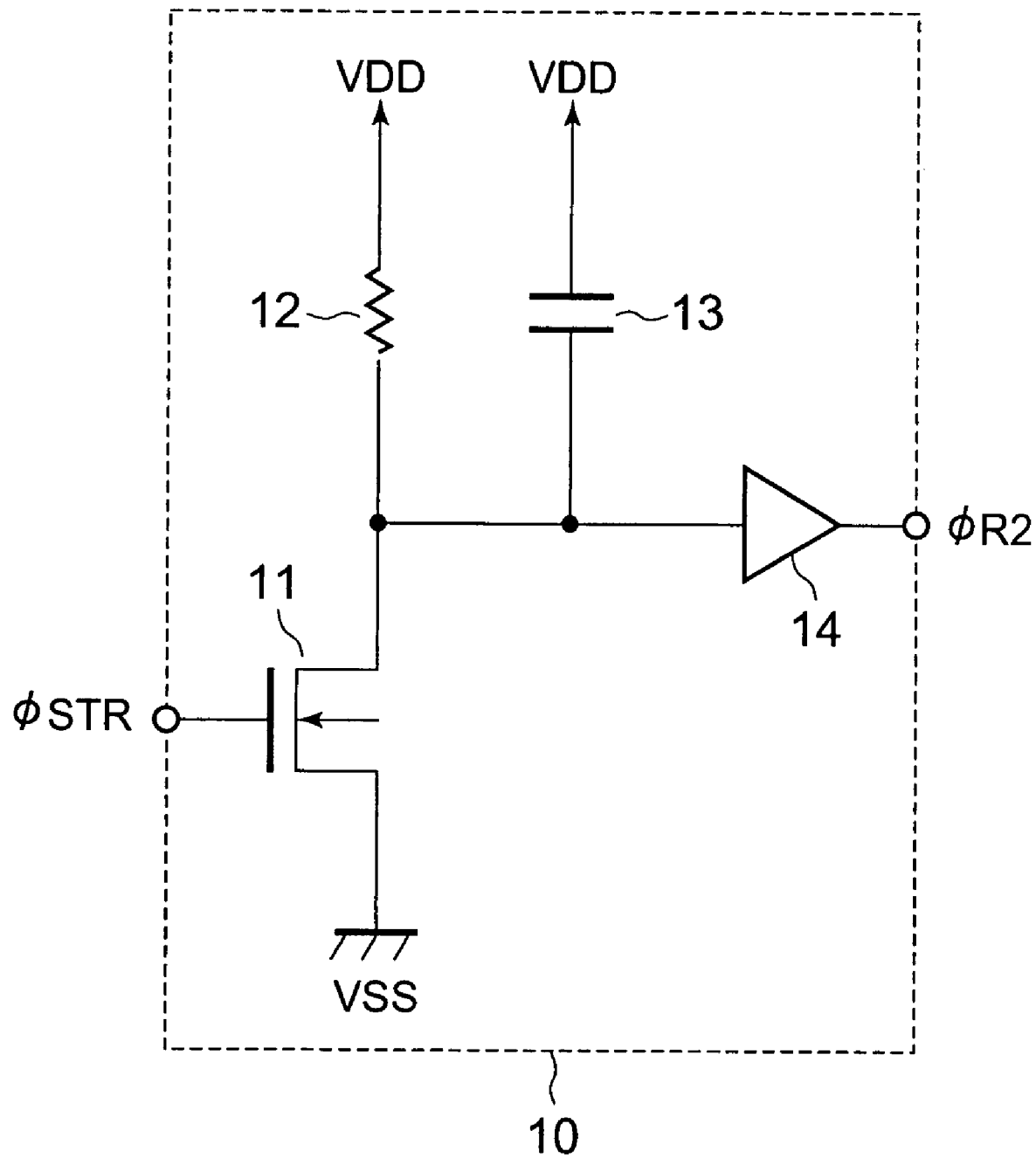
FIG. 3 is a circuit diagram showing an example of a second reset signal output circuit in the embodiment of the present invention.
Figure 4:
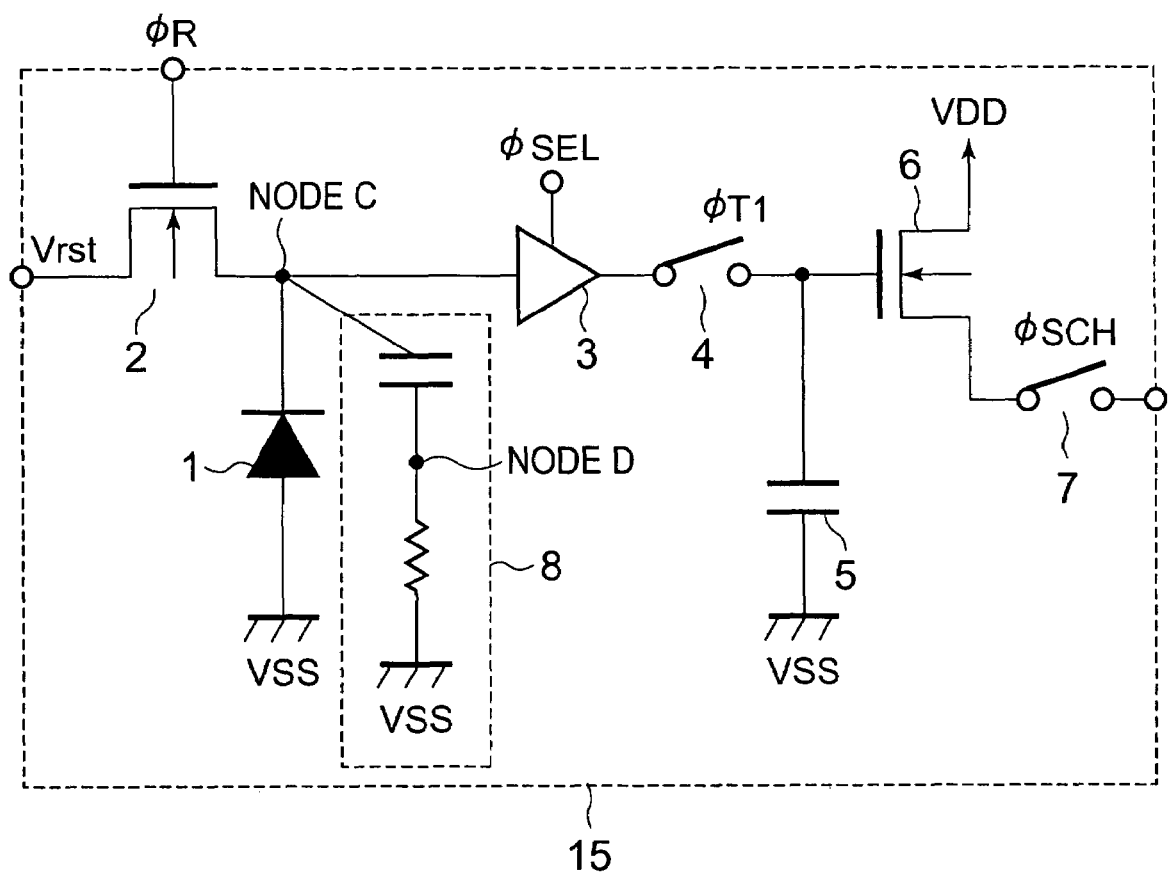
FIG. 4 is a circuit diagram showing a photoelectric conversion block of a photoelectric conversion device used for a conventional image sensor.
Figure 5:
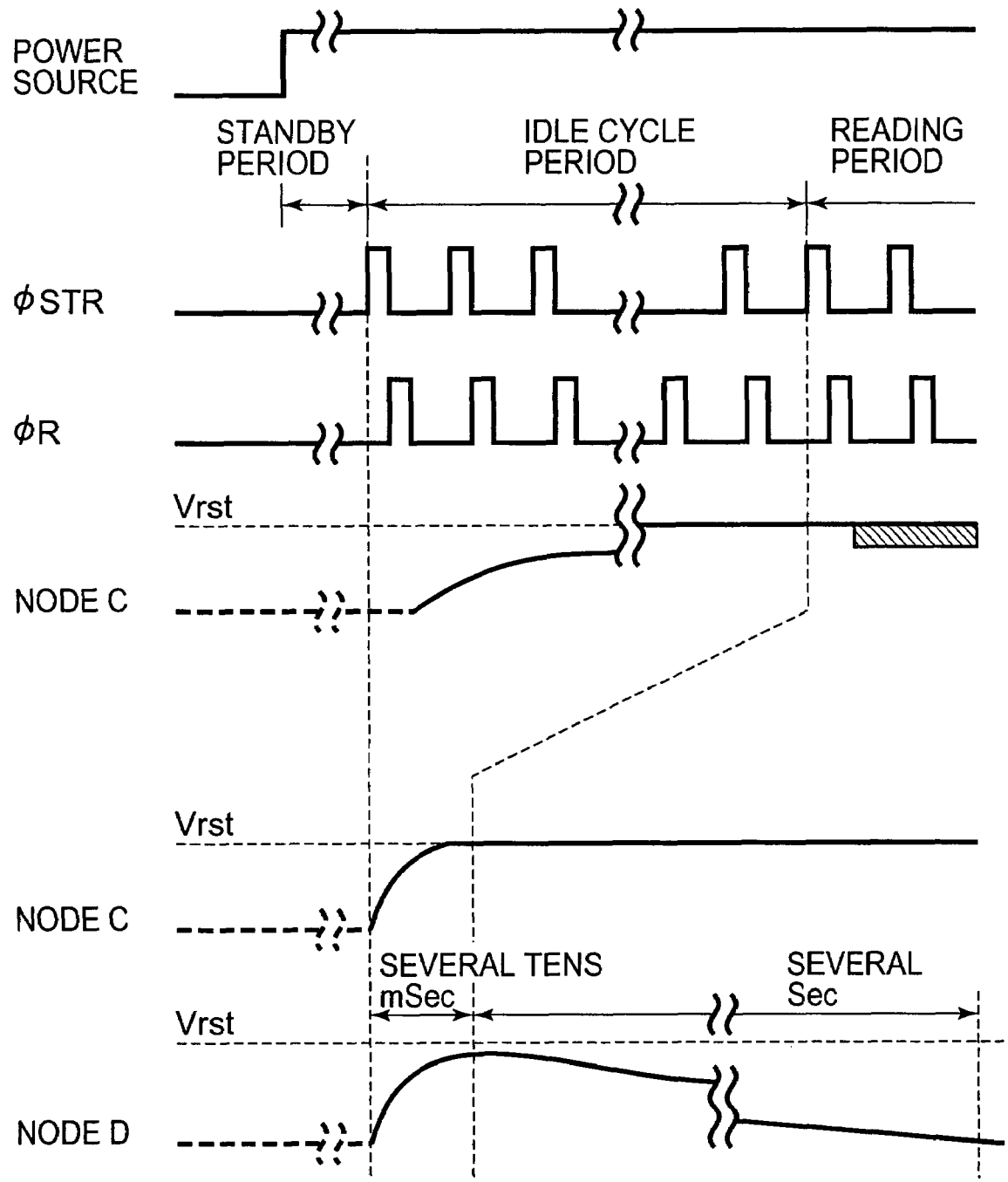
FIG. 5 is a timing chart showing driving signals of the conventional photoelectric conversion device.
Figure 6:
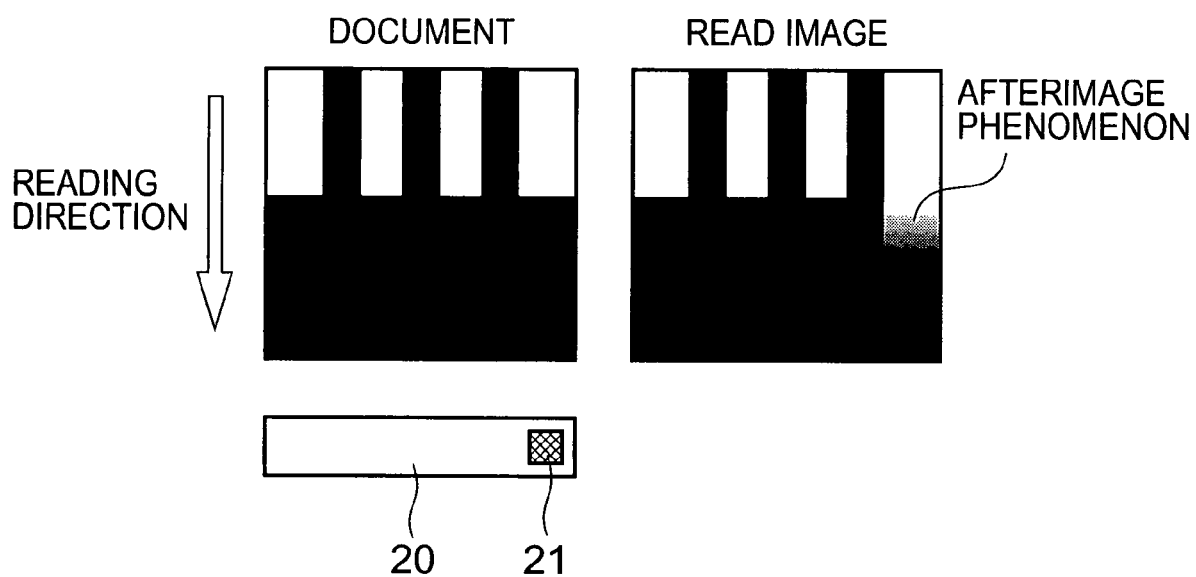
FIG. 6 shows an afterimage phenomenon in the conventional photoelectric conversion device.

FIG. 3 shows an example of the second reset signal output circuit 10 in this embodiment.

The second reset signal output circuit 10 includes a buffer 14 for outputting the second reset signal ΦR2 to the OR circuit 9 and a resistor 12 for supplying a potential of the second reset signal ΦR2 to the buffer 14. The resistor 12 is connected between an input terminal of the buffer 14 and a terminal for a power source voltage VDD. The second reset signal output circuit 10 further includes a switch circuit 11 for making an input potential of the buffer 14 equal to the substrate potential VSS in response to the start signal ΦSTR and a capacitor 13 for maintaining the input terminal of the buffer 14 at the substrate potential VSS for a predetermined period after the time when the switch circuit 11 is turned off. The switch circuit 11 is connected between the input terminal of the buffer 14 and a terminal for the substrate potential VSS. The capacitor 13 is connected between the input terminal of the buffer 14 and the terminal for the power source voltage VDD.

When the above-mentioned structure is used for the second reset signal output circuit 10, during a period between the time when the power source is turned and the time when the start signal ΦSTR is inputted to the switch circuit 11, that is, the standby period, the input potential of the buffer 14 becomes the power source voltage VDD through the resistor 12. Then, the second reset signal ΦR2 is outputted from the buffer 14.

Next, when the image sensor is activated and the start signal ΦSTR is generated, the start signal ΦSTR is inputted to the switch circuit 11. Then, the input potential of the buffer 14 becomes the substrate potential VSS, so that the second reset signal ΦR2 is stopped.

When the start signal ΦSTR is stopped, the switch circuit 11 is turned off. Here, the input potential of the buffer 14 is maintained to the substrate potential VSS for a period Trc determined by a time constant of the resistor 12 and the capacitor 13, so the second reset signal ΦR2 is not outputted from the buffer 14.

Assume that an input interval of the start signal ΦSTR is expressed by T1. Therefore, when T1 is set to satisfy a relationship of T1<Trc, the second reset signal ΦR2 is not outputted during the reading period.

According to the image sensor as described in this embodiment, the second reset signal ΦR2 is maintained in an ON state until the start signal ΦSTR inputted when the image sensor is activated is inputted to the switch circuit 11. Therefore, the node C is reset to the reset potential Vrst in a short time during the standby period, so that the reset potential Vrst can be continuously held.

Thus, after the power source is turned on, the node C is reset to the reset potential Vrst and simultaneously the potential of the node D of the conductive foreign matter 8 becomes the reset potential Vrst. When the standby period after the turning on of the power source is several seconds, the potential of the node D is sufficiently stabilized to the substrate potential VSS.

In other words, the potential of the node D is not varied during the reading period, so that it is possible to prevent an afterimage phenomenon of image data at the time of activation, which occurs in a conventional image sensor.

When the series of reading operation is completed and the start signal ΦSTR is stopped, the second reset signal output circuit 10 outputs the second reset signal ΦR2 to each of the photoelectric conversion blocks 15.

When the reading operation is completed to stop the reset potential Vrst supplied in response to the reset signal ΦR, the potential of the cathode of the photodiode 1 of the photoelectric conversion block 15, that is, the potential of the node C will become the substrate potential VSS by a leak from the photodiode 1. However, the node C is continuously maintained at the reset potential Vrst by the second reset signal ΦR2 during the standby period. Therefore, the afterimage phenomenon of image data at the time of activation can be certainly prevented even in a subsequent reading operation.

An example of the second reset signal output circuit 10 is the circuit as shown in FIG. 3. However, the present invention is not limited to such a circuit. At least a circuit in which the second reset signal ΦR2 is outputted simultaneously with the turning on of the power source and held during the standby period is used.

Signal logic can be changed corresponding to the structure of the reset switch 2.

As described above, according to the photoelectric conversion device used for the image sensor and the driving method therefor in this embodiment, accurate image reading can be performed by reducing the influence of the conductive foreign matter adhered to the light receiving surface of the photoelectric conversion device, so that a high-accuracy contact type image sensor can be provided.

In addition, it is possible to provide a high-accuracy optical reading apparatus used for the contact type image sensor, such as an image scanner or a facsimile machine.

The potentials of the node C and the node D can be initialized and stabilized during the standby period. Therefore, an idle cycle period required in a conventional case can be minimized for circuit initialization. Thus, there is an effect that a start-up period of the image sensor is shortened.

What is claimed is:

1. A photoelectric conversion device, comprising:
a plurality of photoelectric conversion blocks each comprising:
a photoelectric conversion element;
photoelectric conversion element resetting means for supplying an initialization potential to the photoelectric conversion element to reset the photoelectric conversion element; and
transfer means for transferring a voltage of the photoelectric conversion element,
wherein the photoelectric conversion element resetting means resets the photoelectric conversion element every time, during a reading period, the voltage of the photoelectric conversion element is transferred and continues resetting the photoelectric conversion element for a standby period, and wherein the resetting means includes:
a switch connected with a terminal for the initialization potential; and
reset signal output means for controlling an on/off state of the switch; and wherein the reset signal output means outputs to the switch a first reset signal for resetting the photoelectric conversion element, every time during the reading period the voltage of the photoelectric conversion element is transferred, and
the reset signal output means outputs to the switch a second reset signal for keeping the photoelectric conversion element reset for the standby period.

2. A photoelectric conversion device according to claim 1, wherein: the reset signal output means comprises a second reset signal generating circuit for generating the second reset signal; the second reset signal generating circuit generates the second reset signal when a power source is turned on; and the second reset signal generating circuit stops the second reset signal for a predetermined period when a start signal generated during the reading period is inputted.

3. A photoelectric conversion device according to claim 2, wherein the second reset signal generating circuit comprises:
waveform formation means for outputting the second reset signal to the switch;
voltage supplying means connected with an input of the waveform formation means, for supplying a potential of the second reset signal to the input of the waveform formation means;
switch means connected with the input of the waveform formation means, for changing a potential of the input of the waveform formation means to a potential for stopping the second reset signal in response to the start signal; and
voltage holding means connected with the input of the waveform formation means, for holding the potential for stopping the second reset signal as the potential of the input of the waveform formation means when the switch means is turned off.

4. An image sensor, comprising a plurality of photoelectric conversion devices each being the photoelectric conversion device according to claim 1.

5. An optical reading apparatus, comprising the image sensor according to claim 4.

6. A method of driving a photoelectric conversion device comprising a plurality of photoelectric conversion blocks each comprising a photoelectric conversion element, the method comprising:
placing by resetting means the photoelectric conversion element in a reset state for a standby period of the photoelectric conversion element;
releasing by the resetting means the photoelectric conversion element from the reset state in response to a start signal generated during an image reading period of the photoelectric conversion element;
reading an image by the released photoelectric conversion element; and
resetting by the resetting means the photoelectric conversion element every time the image is read therefrom;
wherein the resetting means comprises a switch to be turned on/off to reset the photoelectric conversion element and implements the steps of:
sending to the switch a first reset signal for resetting the photoelectric conversion element, every time during the image is read therefrom and;
sending a second reset signal for keeping the photoelectric conversion element reset for the standby period.

7. A method of driving a photoelectric conversion device according to claim 6, wherein the photoelectric conversion element is reset when a power source is turned on.

* * * * *